United States Patent [19]

Reed

[11] Patent Number: 5,224,294
[45] Date of Patent: Jul. 6, 1993

[54] HYDROPONIC GROWTH SYSTEM

[75] Inventor: James R. Reed, Chadds Ford, Pa.

[73] Assignee: E. I. Du Pont de Nemours and Company, Wilmington, Del.

[21] Appl. No.: 735,842

[22] Filed: Jul. 25, 1991

[51] Int. Cl.$^5$ .................................................. A01G 27/00
[52] U.S. Cl. ............................................... 47/81; 47/62
[58] Field of Search ............. 47/79, 80, 81, 48.5, 47/59, 62, 64

[56] References Cited

U.S. PATENT DOCUMENTS

| | | |
|---|---|---|
| 3,108,400 | 10/1963 | Wolfe, Jr. |
| 3,300,895 | 1/1967 | Dosedla et al. ........................ 47/81 |
| 4,034,506 | 7/1977 | Kasahara et al. |
| 4,245,434 | 1/1981 | Green |
| 4,794,728 | 1/1989 | Tsukada et al. ........................ 47/80 |
| 4,837,973 | 6/1989 | Snekkenes |
| 4,885,869 | 12/1989 | Kim ........................................ 47/79 |
| 4,885,870 | 12/1989 | Fong ...................................... 47/79 |
| 4,908,986 | 3/1990 | Rowland et al. |

FOREIGN PATENT DOCUMENTS

| | | | |
|---|---|---|---|
| 55358 | 2/1891 | Fed. Rep. of Germany | 47/81 |
| 1414605 | 11/1964 | France | 47/81 |
| 497409 | 1/1939 | United Kingdom | 47/81 |
| 1501374 | 2/1978 | United Kingdom | 47/81 |
| 2193072 | 2/1988 | United Kingdom | 47/81 |

Primary Examiner—Carl D. Friedman
Assistant Examiner—Michele A. Van Patten

[57] ABSTRACT

A hydroponic growth system comprising a wicking layer of beaded polystyrene foam to transport water to the bottom of containers on the top surface of the foam, preferably with a heating means under the foam.

4 Claims, 2 Drawing Sheets

HYDROPONIC GROWTH SYSTEM

BACKGROUND OF THE INVENTION

Commercial plant growers use a variety of systems for the watering and feeding of plants. Overhead spraying, in which the sprayed water can contain nutrients for the plants, is widely used. In such systems, the spraying is generally controlled manually or by timers. Such systems necessarily wet the foliage of the plants, which, in turn, promotes the growth of undesired molds and fungi. In addition, overhead spraying is wasteful, since sufficient water must be used to both wet the foliage and saturate the soil beneath the foliage.

In view of the drawbacks of overhead spraying, systems have previously been developed which water the growing plants from the bottom. These systems generally involve periodic flooding of a tray of pots or continuous immersion of growing pots in a layer of water.

SUMMARY OF THE INVENTION

The present invention provides a system which promotes plant growth in a highly efficient manner and prevents disease in the plants through the use of a bottom watering system.

Specifically, the present invention provides a hydroponic growth system comprising a substrate having side walls to form a container; a planar wicking means having a top surface and a bottom surface, the planar wicking means consisting essentially of beaded polystyrene foam sheet; and means to maintain a substantially constant water level above the bottom surface and below the top surface of the foam sheet; the foam sheet having a thickness above the water level of about from $\frac{1}{8}$ to 1 inch.

Preferably, the system further provides a planar heating means positioned on top of and substantially parallel to the substrate and below the wicking means.

DETAILED DESCRIPTION OF THE INVENTION

Figure 1:
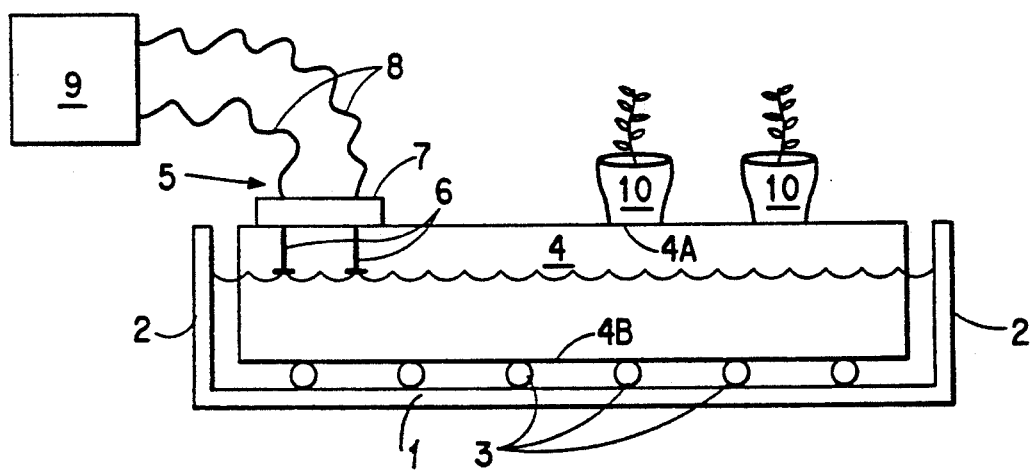
FIG. 1 is a schematic cross-sectional representation of a growth system of the present invention.

A wide variety of substrates can be used in the systems of the present invention, including conventional concrete growing trays of the type often found in greenhouses. In the alternative, shallow trays of plywood can also be used, waterproofed by a liner of plastic or elastomeric material in the form of a film or coating.

The planar wicking means used in the present invention consists essentially of beaded polystyrene foam sheet. The sheet is of the type produced from expandable polystyrene beads or pellets containing pentane or fluorocarbon blowing agents.

In the preparation of the foam sheet, expandable polystyrene, in the form of shapes such as discs or S-shaped strands, can be used. The polystyrene can be deformed under heat and impregnated with a blowing agent in an aqueous suspension or by extrusion in a solution of the blowing agent through a die orifice. Expanded sheets are also commercially available in 16 inch by 8 foot panels, generally having a thickness of $\frac{3}{4}$ inch.

Typically, the polystyrene used has a bulk density of about 0.01 g/cc.

The overall thickness of the foam sheet is not critical, but the sheet should have a thickness above the water level of about from $\frac{1}{8}$ to 1 inch.

The present invention further comprises means to maintain a substantially constant water level above the bottom surface and below the top surface of the foam sheet. The water concentration gradient through the foam sheet is such that precise control of the water level, within $\frac{1}{8}$ inch, is needed if a constant supply of water to the plants is desired.

A wide variety of apparatus can be used to control the water level. However, one particularly good apparatus is that commercially available from IMO Industries, of Plainville, Connecticut, as SAF-PAK. This apparatus operates on 110 volt AC, and consists of a solid state detector circuit and a 6 amp relay circuit. The relay circuit is isolated from the detector circuit. Two wires run to a holder in the water container to form a two-prong probe, which is immersed in the water. When the water level falls below the probe, the detector circuit is broken and opens a solenoid valve, allowing water to flow into the system until the probe circuit is re-established, shutting off the solenoid valve.

Electrical control systems have a greater reliability than, for example, float systems, which can become fouled and which would be difficult to operate in the shallow water levels of the present system.

In a preferred embodiment of the present invention, a planar heating means is positioned on top of and substantially parallel to the substrate. The heating means can, for example, be electrical heating coils imbedded between sheets of plastic or elastomeric material. A preferred heating means comprises elastomeric tubes embedded between sheets of thermoplastic or elastomeric material, through which heated water can be circulated. The size and number of the tubes will vary with a number of factors, including the operating conditions desired for the system, the thickness of the foam sheet and the temperature and pressure of the water supplied. However, tubing having an inner diameter of about from 1/16 to $\frac{1}{4}$ inch, spaced at intervals of about from 2 to 6 inches, has been found to be effective in increasing plant growth in the present system. When the heating means is used, and if a waterproofing liner of plastic or elastomeric material is also used, the liner can be either under or over the heating means.

In another preferred embodiment of the present invention, the water supplied to the foam sheet comprises nutrients for the plants being propagated. The specific nutrient used will, of course, vary with the needs of the particular plants being cultivated. Insufficient fertilizer can deplete the nutrients essential to plant growth, while too much fertilizer can prevent root uptake of both water and fertilizer. The concentration of the fertilizer in the water is conveniently measured by the increased conductivity of the solution resulting from the dissolved salts. Accordingly, a quantity of fertilizer sufficient to provide a conductivity of up to about 2200 micro Siemens/cm, measured at 25° C., is preferably added to the water supplied to the foam sheet.

The instant invention is further illustrated by reference to the drawings, in which FIG. 1 is a schematic cross-sectional representation of a growth system of the present invention. In that Figure, substrate 1 is provided having side walls 2 to form a container. The system as illustrated includes the preferred planar heating means of elastomeric tubes 3. These are positioned on top of and substantially parallel to the substrate and below the wicking means, and connected to a source of heated water, not shown. A planar wicking means 4, consisting essentially of beaded polystyrene foam sheet and having a top surface 4A and a bottom surface 4B, is positioned on top of and substantially parallel to the heating means.

A means to maintain a substantially constant water level is generally designated as element 5, and comprises sensor 6, positioned in the container, connected through support 7 to lead wires 8 to the control means 9. The control means is adjusted and connected, by conventional means, to open and close the water supply so as to maintain the water level in the container above the bottom surface and below the top surface of the foam sheet so that the foam sheet has a thickness above the water level of about from $\frac{1}{8}$ to 1 inch.

Plant containers 10 are positioned on the upper surface of the foam sheet. The water forms a uniform film over the upper surface of the foam sheet, supplying the water to each of the containers. The containers can be made of any conventional material, such as plastic, paper or clay.

Figure 2:
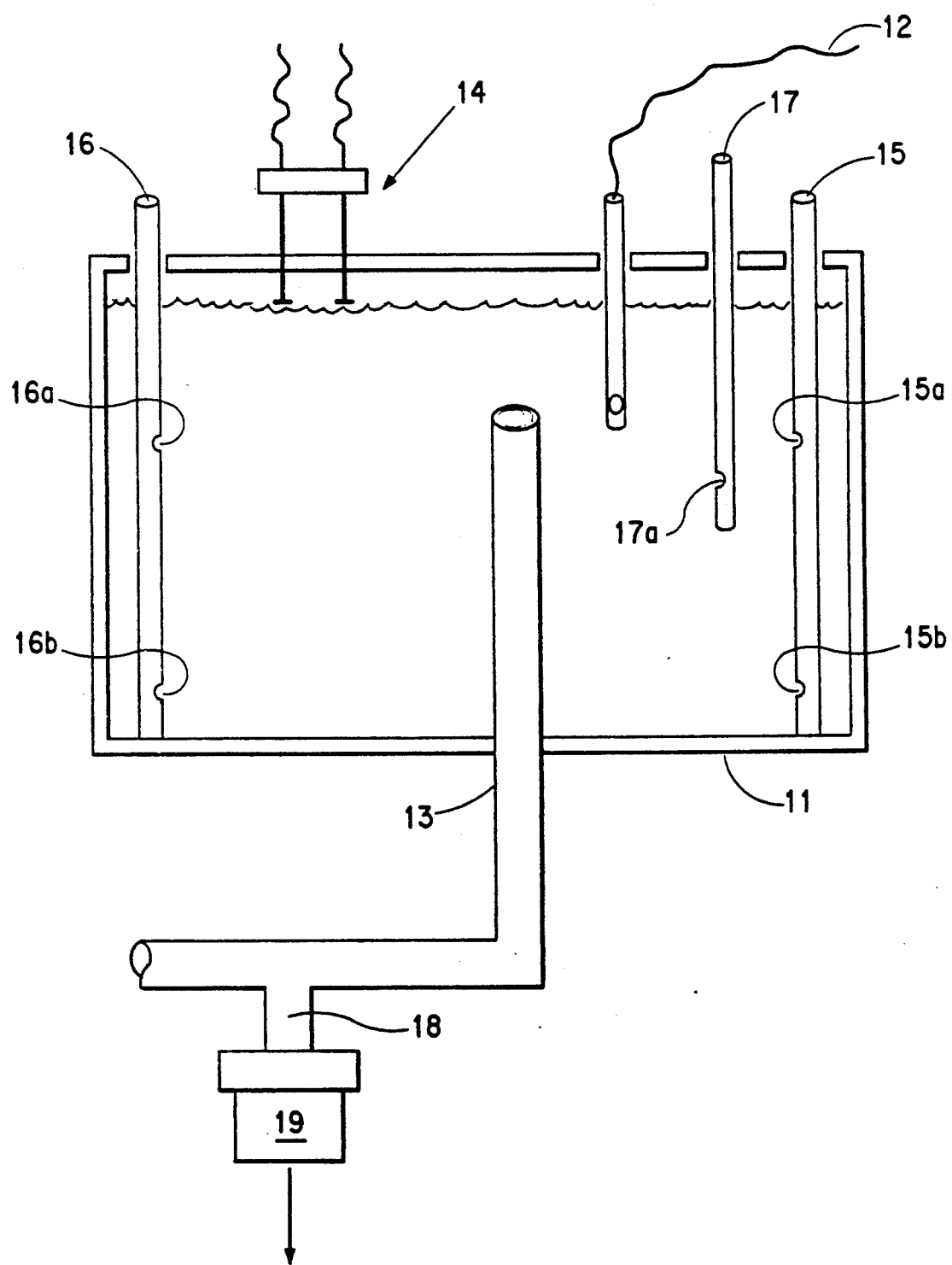
FIG. 2 is a schematic cross-sectional representation of a mixing chamber that can be used in the present system.

FIG. 2 is a schematic cross-sectional representation of a control means and mixing chamber that can be used in the present system for the supply of water and the makeup of fertilizer solutions. There, the fertilizer concentration in tank 11 is measured by a set point conductivity sensor 12 before overflowing out through standpipe 13. Concentrated fertilizer is metered into the tank with a magnetic drive centrifugal pump controlled by the conductivity meter set point (not shown). The water level in the mixing chamber is maintained about 2 inches above the standpipe overflow with a contact sensor 14 in the tank connected through a means to control a solenoid valve in a tap water line (not shown). The incoming make-up water is supplied from two pipes 15 and 16 extending to the bottom. Water exits from the pipes out of orifices 15A, 15B, 16A and 16B, drilled in each of the water pipes. These orifices are drilled at the top and bottom of the submerged section of each pipe. When the solenoid valve is opened, jets of water enter the tank and cause turbulence, which mixes the contents in each tank. Fertilizer concentrate is supplied through supply pipe 17, similarly having an aperture 17A near the conductivity sensor to facilitate mixing of the fertilizer concentrate with the water.

A second tank can be used in conjunction with the first, in which a second fertilizer solution can be prepared. If a second tank is used, a level control is generally not needed. The solutions from each tank are fed to a combined pipe 18, through a pump 19, where they are blended and sent out to the container in the growth system.

A wide variety of standard electrical control means can be used in the present system. One that has been found particularly satisfactory is that commercially available as Safe-Pak relays.

The growth system of the present invention provides a water concentration gradient in the foam sheet which is useful in controlling the amount of water which is delivered to the upper surface of the foam sheet and accordingly, to the bottom of the plant containers positioned on the surface. The water is supplied to the foam surface as a thin film. While providing uniform and continuous water supply, the thin film on the top of the sheet does not waterlog the roots. Moreover, runoff and recycling problems are eliminated with the upward flow of the water and its contained nutrients and the control of the water level to below the upper surface of the foam.

The foam sheet, with a minimum thickness of about $\frac{3}{4}$ inch, can support 12 inch diameter pots over extended periods of time. The polystyrene foams do not degrade from light, heat or chemical fertilizers.

The preferred heating means below the foam sheet helps to drive the warmed water through the sheet. With the thin film of water on the surface of the foam sheet, air currents above the sheet mix the warm humid air around the pots and plants, providing an ideal climate for plant growth. Heat distribution under the foam sheet provides the benefit of the warm and moist air to all of the plants on the sheet.

The bottom watering provided by the present system isolates each pot and plant from cross contamination of water born diseases, since the flow of water is upward through the pot of soil. In addition, with bottom watering, the foliage remains dry, thus minimizing the possibility of fungus and airborn diseases. The present system provides advantages over conventional ebb and flow systems, in that more efficient use of the water and dissolved fertilizers is realized.

I claim:

1. A hydroponic growth system comprising a substrate having side walls to form a container; a planar wicking means having a substantially continuous top surface and a bottom surface, and positioned on top of and substantially parallel to the substrate and consisting essentially of beaded polystyrene foam sheet; and means to maintain a substantially constant water level above the bottom surface and below the top surface of the foam sheet; the foam sheet having a thickness above the water level of about from $\frac{1}{8}$ to 1 inch and an overall thickness substantially greater than the thickness above the water level; and at least one plant container positioned on the upper surface of the foam sheet.

2. A hydroponic growth system of claim 1 wherein the polystyrene foam has a thickness of about $\frac{3}{4}$ inch.

3. A hydroponic growth system of claim 1 wherein the water supplied to the bottom surface of the foam comprises dissolved fertilizer in an amount such that the dissolved salts provide a conductivity of up to about 2200 micro Siemens/cm.

4. A hydroponic growth system of claim 1 further comprising a planar heating means positioned on top of and substantially parallel to the substrate and below the wicking means.

* * * * *